United States Patent
Chao et al.

(10) Patent No.: US 10,936,046 B2
(45) Date of Patent: Mar. 2, 2021

(54) METHOD FOR PERFORMING POWER SAVING CONTROL IN A MEMORY DEVICE, ASSOCIATED MEMORY DEVICE AND MEMORY CONTROLLER THEREOF, AND ASSOCIATED ELECTRONIC DEVICE

(71) Applicant: Silicon Motion Inc., Hsinchu County (TW)

(72) Inventors: Wen-Chi Chao, Hsinchu (TW); Kuo-Cyuan Kuo, Tainan (TW)

(73) Assignee: Silicon Motion, Inc., Hsinchu County (TW)

( * ) Notice: Subject to any disclaimer, the term of this patent is extended or adjusted under 35 U.S.C. 154(b) by 274 days.

(21) Appl. No.: 16/273,166

(22) Filed: Feb. 12, 2019

(65) Prior Publication Data
US 2019/0377402 A1 Dec. 12, 2019

Related U.S. Application Data

(60) Provisional application No. 62/683,041, filed on Jun. 11, 2018.

(51) Int. Cl.
*G06F 1/3234* (2019.01)
*G06F 1/3237* (2019.01)
*G06F 13/16* (2006.01)

(52) U.S. Cl.
CPC .......... *G06F 1/3275* (2013.01); *G06F 1/3237* (2013.01); *G06F 13/1689* (2013.01)

(58) Field of Classification Search
CPC .... G06F 1/3275; G06F 1/3237; G06F 3/0625; G06F 3/0673; G06F 12/1009; G06F 1/12;
(Continued)

(56) References Cited

U.S. PATENT DOCUMENTS 6,611,521 B1 * 8/2003 McKay ................ H04L 1/08
370/392
8,125,357 B1 * 2/2012 Hamlet ............... H03M 7/3086
341/51
(Continued)

FOREIGN PATENT DOCUMENTS

EP 2750046 A2 * 7/2014 ............... G06F 1/08

OTHER PUBLICATIONS

Universal Serial Bus 3.0 Specification, Hewlett-Packard Company et al., Revision 1.0, Nov. 12, 2008, coverpage & pp. 2-2,7-37,7-49~7-52,8-24,8-42,C-2,C-6.

*Primary Examiner* — Aurel Prifti
(74) *Attorney, Agent, or Firm* — Winston Hsu

(57) ABSTRACT

A method for performing power saving control in memory device, the associated memory device and memory controller thereof, and the associated electronic device are provided, where the method is applicable to the memory controller, and the memory device includes the memory controller and a non-volatile (NV) memory. The method may include: during transmitting to a host device, sending end of burst (EOB)-related symbols to the host device, in order to notify the host device of EOB; controlling a physical layer (PHY) circuit to turn off a clock source within the PHY circuit, in order to save power, wherein the PHY circuit is positioned in a transmission interface circuit within the memory controller, and the transmission interface circuit is arranged to perform communications with the host device for the memory device; and when receiving a trigger signal from the host device, utilizing the PHY circuit to turn on the clock source.

20 Claims, 7 Drawing Sheets

(58) Field of Classification Search
CPC . G06F 3/0659; G06F 1/324; G06F 2212/1028
See application file for complete search history.

(56) References Cited

U.S. PATENT DOCUMENTS

| | | | |
|---|---|---|---|
| 9,787,327 B2 | 10/2017 | Zhang | |
| 9,965,018 B1 | 5/2018 | Song | |
| 10,074,053 B2* | 9/2018 | Kumar | G06N 5/045 |
| 10,691,629 B2* | 6/2020 | Thanigasalam | H04N 5/232 |
| 2002/0141580 A1* | 10/2002 | Okuyama | H04N 21/4147 |
| | | | 380/201 |
| 2003/0198196 A1 | 10/2003 | Bahl | |
| 2005/0238055 A1 | 10/2005 | Frodsham | |
| 2006/0080563 A1* | 4/2006 | Perozo | G06F 1/3228 |
| | | | 713/322 |
| 2007/0162648 A1* | 7/2007 | Tousek | G06F 13/28 |
| | | | 710/22 |
| 2009/0119524 A1* | 5/2009 | Hays | G06F 1/3293 |
| | | | 713/322 |
| 2011/0173481 A1* | 7/2011 | Koren | G06F 5/06 |
| | | | 713/600 |
| 2011/0235459 A1* | 9/2011 | Ware | G11C 7/1051 |
| | | | 365/233.11 |
| 2012/0269070 A1* | 10/2012 | Bobrek | H04L 12/12 |
| | | | 370/241 |
| 2013/0083611 A1* | 4/2013 | Ware | G06F 3/0673 |
| | | | 365/191 |
| 2014/0032947 A1* | 1/2014 | Ahmad | G06F 1/3275 |
| | | | 713/320 |
| 2014/0122814 A1* | 5/2014 | Mirichigni | G11C 13/0069 |
| | | | 711/155 |
| 2015/0094875 A1* | 4/2015 | Duzly | G06F 3/0679 |
| | | | 700/300 |
| 2015/0177815 A1* | 6/2015 | Zerbe | G06F 1/324 |
| | | | 713/322 |
| 2015/0178192 A1* | 6/2015 | Lee | G06F 12/0246 |
| | | | 711/103 |
| 2015/0378642 A1* | 12/2015 | Moon | G06F 3/065 |
| | | | 711/103 |
| 2016/0034219 A1* | 2/2016 | Jeter | G06F 3/0683 |
| | | | 711/154 |
| 2016/0041786 A1* | 2/2016 | Erez | G06F 3/0658 |
| | | | 711/103 |
| 2016/0062690 A1 | 3/2016 | Shin | |
| 2016/0373112 A1* | 12/2016 | Hwang | H03K 19/0016 |
| 2017/0068480 A1* | 3/2017 | Huang | G06F 3/0625 |
| 2017/0070381 A1* | 3/2017 | Chellappan | H04L 41/0654 |
| 2017/0262208 A1* | 9/2017 | Chooi | G06F 1/3275 |
| 2017/0277446 A1* | 9/2017 | Cheong | G06F 1/3268 |
| 2017/0337988 A1* | 11/2017 | Yun | G11C 29/56012 |
| 2018/0011527 A1* | 1/2018 | Kim | G06F 3/065 |
| 2018/0018118 A1* | 1/2018 | Raghava | G06F 1/08 |
| 2018/0107594 A1* | 4/2018 | Lee | G06F 12/0292 |
| 2018/0136843 A1* | 5/2018 | Lee | G06F 3/0659 |
| 2018/0181528 A1* | 6/2018 | Shih | G06F 1/12 |
| 2018/0182452 A1* | 6/2018 | Lee | G11C 11/5671 |
| 2018/0275887 A1* | 9/2018 | Yang | G06F 3/0652 |
| 2018/0293201 A1* | 10/2018 | Yu | G06F 13/4243 |
| 2019/0050048 A1* | 2/2019 | Kang | G06F 1/3275 |
| 2019/0065086 A1* | 2/2019 | Margetts | G06F 3/0659 |
| 2019/0147926 A1* | 5/2019 | Branover | G06F 1/3206 |
| | | | 327/158 |
| 2019/0354475 A1* | 11/2019 | Choi | G06F 1/30 |
| 2020/0036453 A1* | 1/2020 | Rajadurai | H04B 17/0085 |

* cited by examiner

METHOD FOR PERFORMING POWER SAVING CONTROL IN A MEMORY DEVICE, ASSOCIATED MEMORY DEVICE AND MEMORY CONTROLLER THEREOF, AND ASSOCIATED ELECTRONIC DEVICE

CROSS REFERENCE TO RELATED APPLICATIONS

This application claims the benefit of U.S. provisional application No. 62/683,041, which was filed on Jun. 11, 2018, and is included herein by reference.

BACKGROUND OF THE INVENTION

1. Field of the Invention

The present invention is related to memory control, and more particularly, to a method and apparatus for performing power saving control in a memory device, for example, with regard to a phase for MK2 Extension of Unified Protocol (UniPro) specification of Mobile Industry Processor Interface (MIPI) Alliance.

2. Description of the Prior Art

A storage device comprising a Flash memory may be arranged to store data (e.g. user data), and the management of accessing the Flash memory is complicated. For example, the storage device may be a memory card, a Solid State Drive (SSD), or an embedded storage device such as that conforming to Universal Flash Storage (UFS) specification. When a manufacture tries to enhance some features of the storage device according to MIPI UniPro specification, some problems may occur. More particularly, the related art fails to provide a proper solution for implementing power saving control mechanism. Thus, a novel method and associated architecture are needed for solving the problems without introducing any side effect or in a way that is less likely to introduce a side effect.

SUMMARY OF THE INVENTION

It is therefore an objective of the present invention to provide a method and apparatus for performing power saving control in a memory device, for example, with regard to a phase for MK2 Extension of MIPI UniPro specification, in order to solve the above-mentioned problems.

At least one embodiment of the present invention provides a method for performing power saving control in a memory device, where the method is applicable to a memory controller of the memory device. The memory device may comprise the memory controller and a non-volatile (NV) memory, and the NV memory may comprise at least one NV memory element (e.g. one or more NV memory elements). The method may comprise: during transmitting to a host device, sending end of burst (EOB)-related symbols to the host device, in order to notify the host device of EOB; controlling a physical layer (PHY) circuit to turn off a clock source within the PHY circuit, in order to save power, wherein the PHY circuit is positioned in a transmission interface circuit within the memory controller, and the transmission interface circuit is arranged to perform communications with the host device for the memory device; and when receiving a trigger signal from the host device, utilizing the PHY circuit to turn on the clock source.

In addition to the above method, the present invention also provides a memory device, and the memory device comprises a NV memory and a memory controller. The NV memory is arranged to store information, wherein the NV memory may comprise at least one NV memory element (e.g. one or more NV memory elements). The memory controller is coupled to the NV memory, and the memory controller is arranged to control operations of the memory device. In addition, the memory controller comprises a processing circuit that is arranged to control the memory controller according to a plurality of host commands from a host device to allow the host device to access the NV memory through the memory controller, and comprises a transmission interface circuit that is coupled to the processing circuit and arranged to perform communications with the host device for the memory device. For example, the transmission interface circuit may comprise a PHY circuit that is arranged to perform physical layer operations for the transmission interface circuit. During transmitting to the host device, the memory controller may send EOB-related symbols to the host device, in order to notify the host device of EOB. The memory controller may control the PHY circuit to turn off a clock source within the PHY circuit, in order to save power. When receiving a trigger signal from the host device, the PHY circuit may turn on the clock source.

According to some embodiments, an associated electronic device is also provided. The electronic device may comprise the above memory device, and may further comprise: the host device, coupled to the memory device. The host device may comprise: at least one processor, arranged for controlling operations of the host device; and a power supply circuit, coupled to the at least one processor, arranged for providing power to the at least one processor and the memory device. In addition, the memory device may provide the host device with storage space.

In addition to the above method, the present invention also provides a memory controller of a memory device, where the memory device comprises the memory controller and a NV memory. The NV memory may comprise at least one NV memory element (e.g. one or more NV memory elements). In addition, the memory controller comprises a processing circuit that is arranged to control the memory controller according to a plurality of host commands from a host device, to allow the host device to access the NV memory through the memory controller, and comprises a transmission interface circuit that is coupled to the processing circuit and arranged to perform communications with the host device for the memory device. For example, the transmission interface circuit may comprise a PHY circuit that is arranged to perform physical layer operations for the transmission interface circuit. During transmitting to the host device, the memory controller may send EOB-related symbols to the host device, in order to notify the host device of EOB. The memory controller may control the PHY circuit to turn off a clock source within the PHY circuit, in order to save power. When receiving a trigger signal from the host device, the PHY circuit may turn on the clock source.

According to some embodiments, the apparatus of the present invention may comprise at least one portion (e.g. a portion or all) of the electronic device. For example, the apparatus may comprise the memory controller within the memory device. In another example, the apparatus may comprise the memory device. In yet another example, the apparatus may comprise the electronic device.

The present invention method and associated apparatus can guarantee that the memory device can operate properly in various situations. For example, the method provides multiple control schemes for power saving control. In addition, the electronic device and the memory device will not suffer from unnecessary power consumption.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
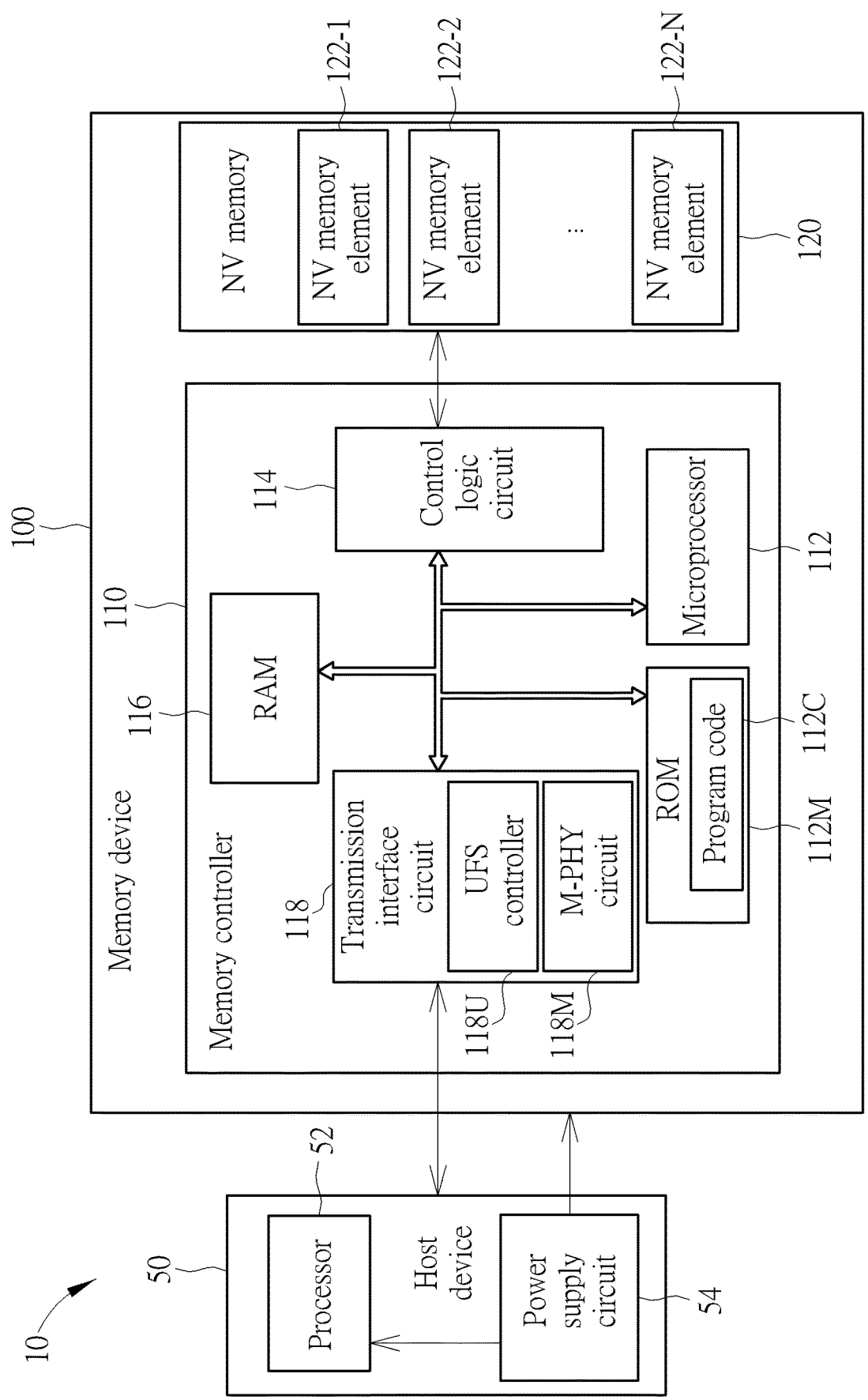
FIG. 1 is a diagram of an electronic device according to an embodiment of the present invention, where the electronic device may comprise a host device and a memory device.

FIG. 1 is a diagram of an electronic device 10 according to an embodiment of the present invention, where the electronic device 10 may comprise a host device 50 and a memory device 100. The host device 50 may comprise at least one processor (e.g. one or more processors) which may be collectively referred to as the processor 52, and may further comprise a power supply circuit 54 that is coupled to the processor 52. The processor 52 is arranged for controlling operations of the host device 50, and the power supply circuit 54 is arranged for providing power to the processor 52 and the memory device 100, and outputting one or more driving voltages to the memory device 100. The memory device 100 may be arranged for providing the host device 50 with storage space, and obtaining the one or more driving voltages from the host device 50 as power source of the memory device 100. Examples of the host device 50 may include, but are not limited to: a multifunctional mobile phone, a wearable device, a tablet computer, and a personal computer such as a laptop computer. Examples of the memory device 100 may include, but are not limited to: an embedded storage device such as that conforming to Universal Flash Storage (UFS) specification. According to this embodiment, the memory device 100 may comprise a memory controller 110 and a non-volatile (NV) memory 120, where the memory controller 110 is arranged to control operations of the memory device 100 and access the NV memory 120, and the NV memory 120 is arranged to store information. The NV memory 120 may comprise at least one NV memory element (e.g. one or more NV memory elements), such as a plurality of NV memory elements 122-1, 122-2, ..., and 122-N, where "N" may represent a positive integer that is greater than one. For example, the NV memory 120 may be a flash memory, and the plurality of NV memory elements 122-1, 122-2, ..., and 122-N may be a plurality of flash memory chips or a plurality of flash memory dies, but the present invention is not limited thereto.

As shown in FIG. 1, the memory controller 110 may comprise a processing circuit such as a microprocessor 112, a storage unit such as a read-only memory (ROM) 112M, a control logic circuit 114, a random access memory (RAM) 116, and a transmission interface circuit 118, where the above components may be coupled to one another via a bus. The RAM 116 is implemented by a Static RAM (SRAM), but the present invention is not limited thereto. The RAM 116 may be arranged to provide the memory controller 110 with internal storage space. For example, the RAM 116 may be utilized as a buffer memory for buffering data. In addition, the ROM 112M of this embodiment is arranged to store a program code 112C, and the microprocessor 112 is arranged to execute the program code 112C to control the access of the flash memory 120. Note that, in some examples, the program code 112C may be stored in the RAM 116 or any type of memory. Further, a data protection circuit (not shown) in the control logic circuit 114 may protect data and/or perform error correction, and the transmission interface circuit 118 may conform to a specific communications specification (e.g. UFS specification), and may perform communications according to the specific communications specification, for example, perform communications with the host device 50 for the memory device 100. The transmission interface circuit 118 may comprise a UFS controller 118U and a M-PHY circuit 118M, which may interact with each other.

In this embodiment, the host device 50 may transmit host commands and corresponding logical addresses to the memory controller 110 to access the memory device 100. The memory controller 110 receives the host commands and the logical addresses, and translates the host commands into memory operating commands (which may be simply referred to as operating commands), and further controls the NV memory 120 with the operating commands to perform reading, writing/programming, etc. on memory units (e.g. data pages) having physical addresses within the flash memory 120, where the physical addresses correspond to the logical addresses. When the memory controller 110 perform an erase operation on any NV memory element 122-n of the plurality of NV memory elements 122-1, 122-2, ..., and 122-N (in which "n" may represent any integer in the interval [1, N]), at least one block of multiple blocks of the NV memory element 122-n may be erased, where each block of the blocks may comprise multiple pages (e.g. data pages), and an access operation (e.g. reading or writing) may be performed on one or more pages.

For example, the memory device 100 may store data for the host device 50, and the memory device 100 may read the stored data in response to a host command from the host device 50, and provide the host device 50 with the data read from the NV memory 120. In order to save power in an extreme manner, the memory device 100 may fall asleep as soon as possible, for example, immediately after completion of sending the data to the host device 50. According to this embodiment, the memory device 100 (e.g. the memory controller 110) may perform power saving control with regard to a phase for MK2 Extension of MIPI UniPro specification. Under control of the memory controller 110, the memory device 100 may enter an advanced power saving mode, for example, when one or more transmission lanes (e.g. UFS lanes) between the memory controller 110 (e.g. the transmission interface circuit 118) and the host device 50 (e.g. a corresponding transmission interface circuit therein) are in Stall or Sleep state. Based on the architecture shown in FIG. 1, unnecessary power consumption can be prevented.

Figure 2:
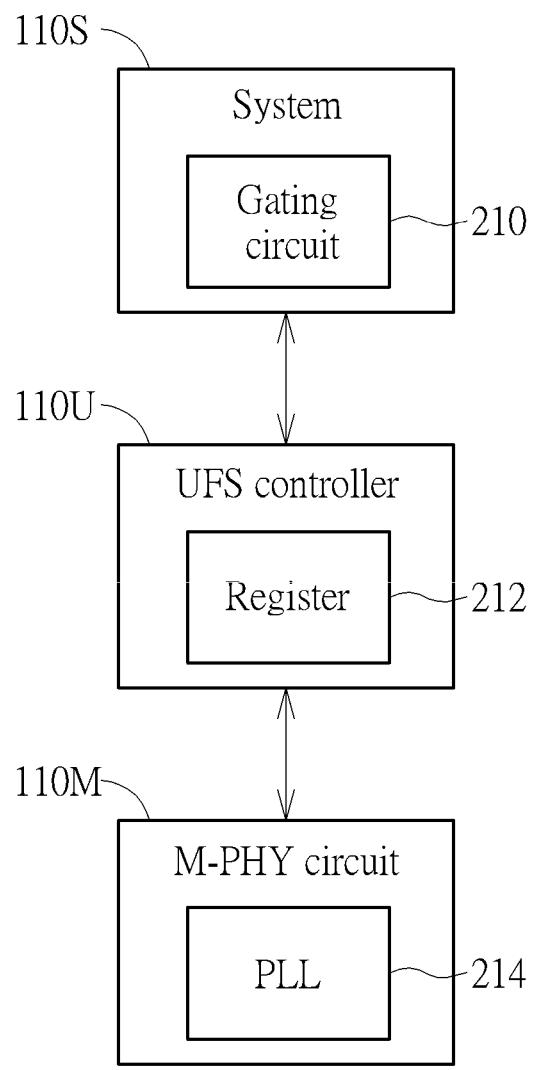
FIG. 2 illustrates some implementation details regarding the memory device shown in FIG. 1 according to an embodiment of the present invention.

FIG. 2 illustrates some implementation details regarding the memory device 100 shown in FIG. 1 according to an embodiment of the present invention. The system 110S may comprise most components within the memory controller 110, such as that outside the UFS controller 118U and the M-PHY circuit 118M. For example, the system 110S may comprise the microprocessor 112, the ROM 112M, the control logic circuit 114, and the RAM 116, and may further comprise a gating circuit 210, for performing clock gating to save power. In addition, the UFS controller 118U may comprise some registers 212, and the M-PHY circuit 118M may comprise a phase-locked loop (PLL) 214. For example, the UFS controller 118U may store and update some information in the registers 212, to allow the system 110S (e.g. the microprocessor 112) to monitor the UFS controller 118U according to the information, where the information may indicate statuses or states of the UFS controller 118U, but the present invention is not limited thereto. The M-PHY circuit 118M may utilize the PLL 214 as a clock source, and may perform physical layer operations (operations of the physical layer) according to the clock generated by the PLL 214.

Figure 3:
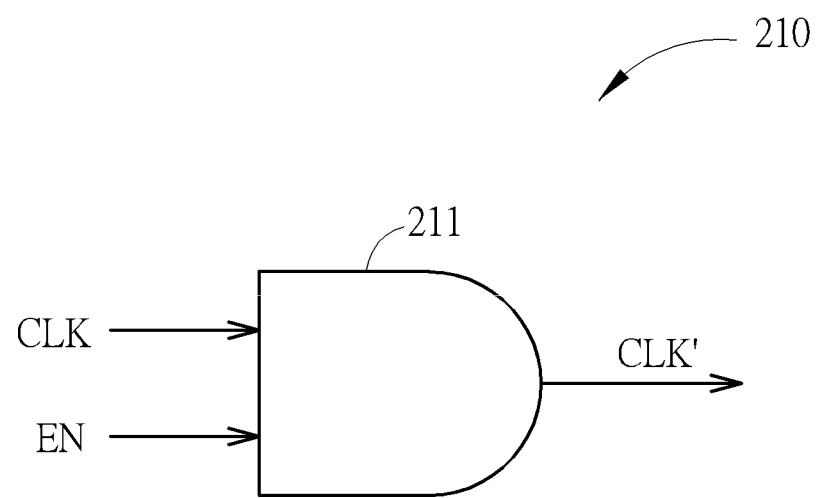
FIG. 3 illustrates a first control scheme of a method for performing power saving control in a memory device according to an embodiment of the present invention.

FIG. 3 illustrates a first control scheme of a method for performing power saving control in a memory device (e.g. the memory device 100) according to an embodiment of the present invention. When the memory controller 110 (e.g. the microprocessor 112) controls the memory device 100 to enter the advanced power saving mode, the M-PHY circuit 118M may turn off the PLL 214 to save power, and the system 110S may perform clock gating on some modules of the memory controller 110, such as the UFS controller 118U and a portion of the system 110S (e.g. the SRAM 116, Error Correction Code (ECC) engine in the control logic circuit 114, one or more analog circuits, and so on). For example, the memory controller 110 may utilize the gating circuit 210 to perform clock gating on the modules such as the UFS controller 118U and the portion of the system 110S.

As shown in FIG. 3, the gating circuit 210 may comprise at least one logic gate (e.g. one or more logic gates) such as an AND gate 211, but the present invention is not limited thereto. The AND gate 211 is arranged to receive an enabling signal EN and receive a clock signal CLK to be controlled with clock gating. For example, the memory controller 110 (e.g. the microprocessor 112) may control a logical state of the enabling signal EN, such as a first state or a second state, to selectively enable or disable the clock signal CLK, in order to perform clock gating. When the enabling signal EN is at the first state (e.g. the enabling signal EN may have a predetermined voltage level greater than 0 V), the gating circuit 210 (e.g. the AND gate 211) outputs the clock signal CLK as the output signal CLK'. When the enabling signal EN is at the second state (e.g. the enabling signal EN may have a ground level such as 0 V), the gating circuit 210 (e.g. the AND gate 211) prevents outputting the clock signal CLK as the output signal CLK', and more particularly, keeps the output signal CLK' staying at the ground level (e.g. 0 V).

According to this embodiment, by disabling the clock signal CLK (e.g. keeping the output signal CLK' staying at the ground level), the memory controller 110 (e.g. the microprocessor 112) can stop operation of any module that is coupled to the output signal CLK' (e.g. any of the modules mentioned above), to reduce power consumption of the module. For example, the memory controller 110 (e.g. the microprocessor 112) may enable the clock signal CLK in a normal operation mode of the memory device 100, to allow the module to operate according to the clock signal CLK that is output as the output signal CLK'. When determining to enter the advanced power saving mode, the memory controller 110 (e.g. the microprocessor 112) may disable the clock signal CLK to make the module stop operating. Thus, the memory controller 110 can perform clock gating on any of the modules (e.g. the UFS controller 118U and the portion of the system 110S).

According to some embodiments, the architecture of the gating circuit 210 may vary. For example, the number of clock signals {CLK} to be controlled with clock gating and/or the number of logic gates may vary. For another example, the gating circuit 210 may comprise any of other types of logic gates (e.g. OR gate, NAND gate, etc.) and/or one or more inverters.

According to some embodiments, the memory controller 110 may comprise a control register, for storing a logical value determined by the microprocessor 112. A specific logic gate within the aforementioned at least one logic gate may be coupled to the control register, and may receive an enabling signal having a logical state corresponding to the logical value. The AND gate 211 may be taken as an example of the specific logic gate, where the AND gate 211 may be coupled to the control register, and may receive the enabling signal EN having the logical state corresponding to the logical value. As a result, the microprocessor 112 may determine the logical value to control the specific logic gate such as the AND gate 211 through the enabling signal EN.

Figure 4:
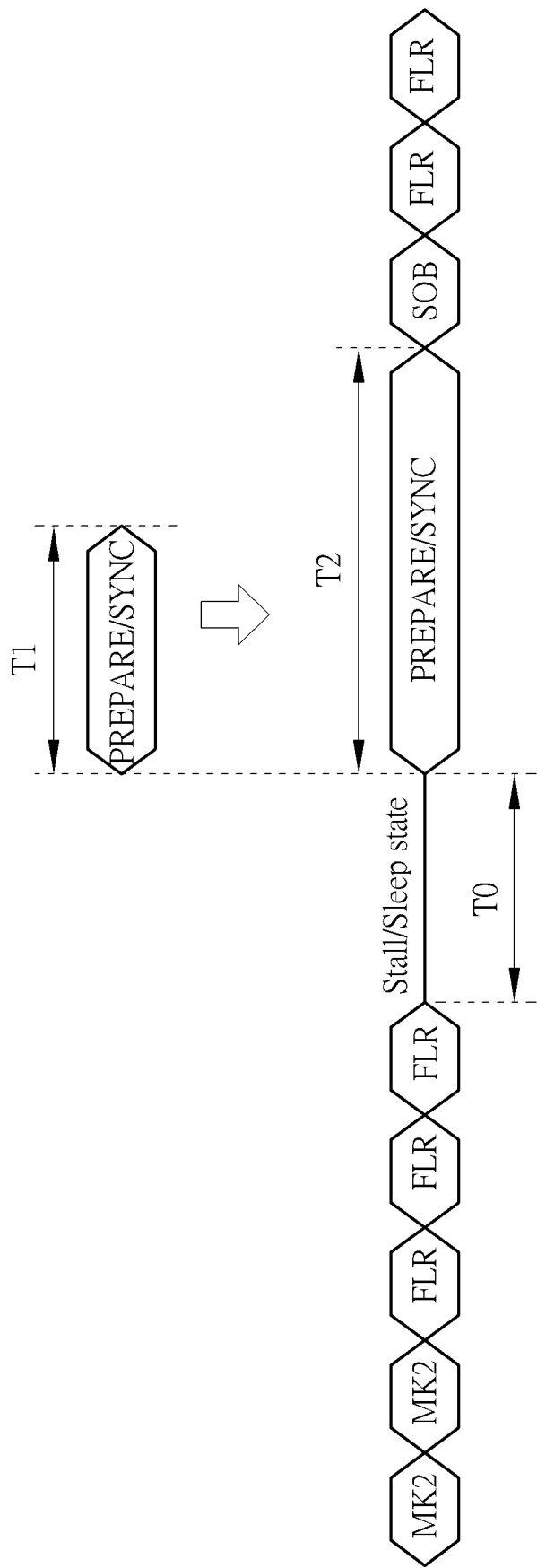
FIG. 4 illustrates some symbols and parameters in the method according to an embodiment of the present invention.

FIG. 4 illustrates some symbols and parameters in the method according to an embodiment of the present invention. The memory controller 110 (e.g. the transmission interface circuit 118) and the host device 50 (e.g. the corresponding transmission interface circuit therein) may communicate with each other through some control symbols. Examples of the control symbols may include, but are not limited to: Marker-2 (MK2) and Filler (FLR) symbols, which may be referred to as MK2 and FLR, respectively, for brevity. One of the memory controller 110 and the host device 50 may send a pair of MK2 symbols such as {MK2, MK2} to indicate that entering the advanced power saving mode is required or confirmed, and may send a predetermined number of FLR symbols such as {FLR, ..., FLR} for one or more other purposes. For example, the predetermined number may be three or one of other positive values. During the time period T0, the memory controller 110 can perform clock gating on the modules and control the M-PHY circuit 118M to turn off the PLL 214, to make the memory device 100 enter the advanced power saving mode. When waking up the memory device 100, the host device 50 (e.g. the corresponding transmission interface circuit therein) may trigger the memory device 100 with a predetermined signal (e.g. a differential signal having a predetermined state at a differential pair of a transmission lane), such as a Prepare signal PREPARE, or with at least one Synchronization symbol SYNC (e.g. one or more synchronization symbols), such as a set of Synchronization symbols {SYNC}. For example, during a predetermined time period T2 for the memory device 100 to wake up from the advanced power saving mode, the corresponding transmission interface circuit may transmit the Prepare signal PREPARE or the Synchronization symbols {SYNC}. The memory controller 110 may determine the length of the predetermined time period T2 to allow the memory device 100 to wake up from the advanced power saving mode in time, and may notify the host device 50 of the length of the predetermined time period T2 in advance, but the present invention is not limited thereto. In some embodiments, the predetermined time period T2 may be determined according to default settings, for example, by the memory controller 110 or the host device 50. The predetermined time period T2 is greater than a predetermined time period T1 for the memory device 100 to wake up from a normal power saving mode, where sending the pair of MK2 symbols such as {MK2, MK2} may be replaced with sending one MK2 symbol, to indicate that entering the normal power saving mode is required or confirmed, but the present invention is not limited thereto.

According to some embodiments, the memory controller 110 may perform the following operations to enter the advanced power saving mode. First, the memory controller 110 may send MK2 symbols such as {MK2, MK2} when it is the end of burst (EOB), such as the end of a series of information (e.g. data symbols) transmitted on the transmission lane. For example, the UFS controller 118U may send the MK2 symbols such as {MK2, MK2} to the host device 50 through the M-PHY circuit 118M. Afterward (e.g. after sending the MK2 symbols such as {MK2, MK2}), when the UFS controller 118U is idle (e.g. there is no command to be executed) and ready (e.g. ready for starting the advanced power saving mode), the UFS controller 118U may request the M-PHY circuit 118M to perform power saving, such as power saving operations for the advanced power saving mode. For example, the UFS controller 118U may send an advanced power saving mode request to the M-PHY circuit 118M. After receiving the advanced power saving mode request, the M-PHY circuit 118M may turn off the PLL 214, and send an acknowledge (ACK) to the UFS controller 118U, for indicating that the M-PHY circuit 118M is ready (e.g. ready for starting the advanced power saving mode). For example, the clock generated by the PLL 214 may be utilized as a reference clock for receiving or transmitting symbols, and may be referred to as symbol clock, but the present invention is not limited thereto. Afterward (e.g. after the ACK is sent to the UFS controller 118U), when the UFS controller 118U and the M-PHY circuit 118M are ready (e.g. ready for starting the advanced power saving mode), the system 110S may perform clock gating. For example, the system 110S may perform clock gating on the modules such as the UFS controller 118U and the portion of the system 110S, to disable the clocks originally input into the modules. As a result, the memory controller 110 may control the memory device 100 to enter the advanced power saving mode. According to some embodiments, in addition to turning off the PLL 214, the M-PHY circuit 118M may also turn off one or more other sub-circuits thereof before sending the ACK to the UFS controller 118U, in order to extremely save power.

According to some embodiments, the memory controller 110 may perform the following operations to exit the advanced power saving mode. First, when receiving the predetermined signal (such as the Prepare signal PREPARE) or the Synchronization symbol SYNC, the M-PHY circuit 118M may wake up and turn on the PLL 214 (more particularly, enable the symbol clock), and may issue a wake-up signal to the system 110S. For example, the predetermined signal may represent the differential signal having the predetermined state at the differential pair of the transmission lane, such as that received at the differential pair RXDP and RXDN of the receiver side M-RX in the transmission lane, where the transmission interface circuit 118 (e.g. the M-PHY circuit 118M) may play the role of the receiver side M-RX when receiving the predetermined signal, but the present invention is not limited thereto. Afterward, when detecting the wake-up event (e.g. the wake-up signal), the system 110S may enable the clocks that are previously disabled.

Figure 5:
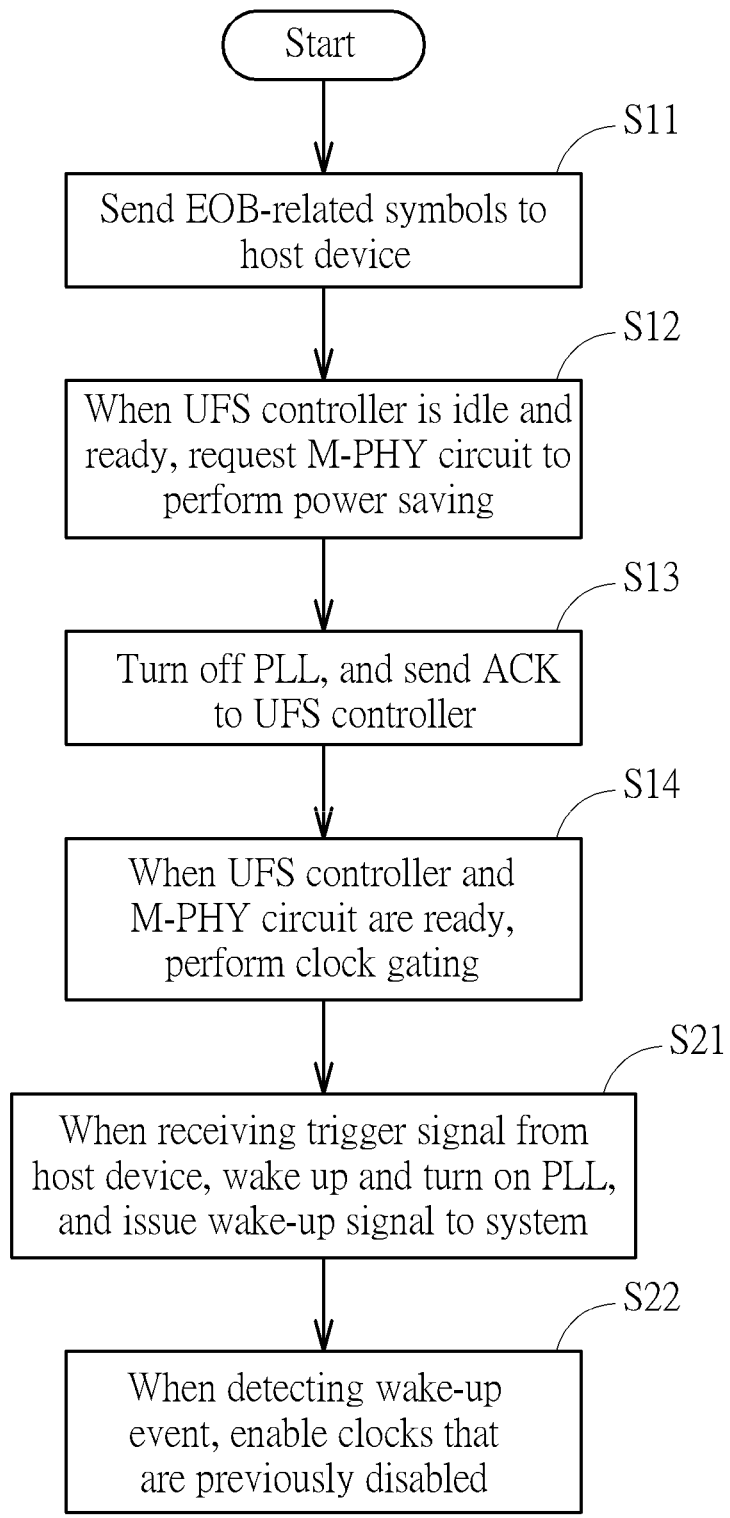
FIG. 5 illustrates a working flow of the method according to an embodiment of the present invention.

FIG. 5 illustrates a working flow of the method according to an embodiment of the present invention. According to this embodiment, the memory controller 110 may perform operations of the working flow to enter or exit the advanced power saving mode.

In Step S11, during transmitting to the host device 50, when it is the end of burst (EOB), such as the end of a series of information (e.g. data symbols) transmitted on the transmission lane, the memory controller 110 may send EOB-related symbols to the host device 50, in order to notify the host device 50 of the EOB. According to this embodiment, the EOB-related symbols may comprise MK2 symbols such as {MK2, MK2}. For example, the UFS controller 118U may send the EOB-related symbols (e.g. the MK2 symbols such as {MK2, MK2}) to the host device 50 through the M-PHY circuit 118M.

In Step S12, when the UFS controller 118U is idle (e.g. there is no command to be executed) and ready (e.g. ready for starting the advanced power saving mode), the UFS controller 118U may request the M-PHY circuit 118M to perform power saving, such as power saving operations for the advanced power saving mode. For example, the UFS controller 118U may send an advanced power saving mode request to the M-PHY circuit 118M, in order to request the M-PHY circuit 118M to perform power saving.

In Step S13, after receiving the advanced power saving mode request, the M-PHY circuit 118M may turn off the PLL 214, and send an acknowledge (ACK) to the UFS controller 118U, for indicating that the M-PHY circuit 118M is ready (e.g. ready for starting the advanced power saving mode). For example, the clock generated by the PLL 214 may be utilized as a reference clock for receiving or transmitting symbols, and may be referred to as symbol clock, but the present invention is not limited thereto.

In Step S14, when the UFS controller 118U and the M-PHY circuit 118M are ready (e.g. ready for starting the advanced power saving mode), the memory controller 110 (e.g. the system 110S) may perform clock gating. For example, the memory controller 110 (e.g. the system 110S) may perform clock gating on the modules such as the UFS controller 118U and the portion of the system 110S, to disable the clocks originally input into the modules.

In Step S21, when receiving a trigger signal from the host device 50, the M-PHY circuit 118M may wake up and turn on the PLL 214 (more particularly, enable the symbol clock), and may issue a wake-up signal to the system 110S. According to this embodiment, the trigger signal may comprise the predetermined signal (such as the Prepare signal PREPARE) or the Synchronization symbol SYNC. For example, the predetermined signal may represent the differential signal having the predetermined state at the differential pair of the transmission lane, such as that received at the differential pair RXDP and RXDN of the receiver side M-RX in the transmission lane, where the transmission interface circuit 118 (e.g. the M-PHY circuit 118M) may play the role of the receiver side M-RX when receiving the predetermined signal, but the present invention is not limited thereto.

In Step S22, when detecting the wake-up event (e.g. the wake-up signal), the system 110S may enable the clocks that are previously disabled.

According to some embodiments, in addition to turning off the PLL 214, the M-PHY circuit 118M may also turn off one or more other sub-circuits thereof before sending the ACK to the UFS controller 118U, in order to extremely save power.

According to some embodiments, after sending the EOB-related symbols to the host device 50, the memory controller 110 may control the M-PHY circuit 118M to turn off a clock source therein (e.g. the PLL 214), in order to save power, where the EOB-related symbols may conform to UniPro specification. For example, the EOB-related symbols may comprise a pair of predetermined symbols such as {MK2, MK2}. When receiving the trigger signal from the host device 50, the M-PHY circuit 118M may automatically turn on the clock source (e.g. the PLL 214). More particularly, the memory controller 110 (e.g. the processing circuit such as the microprocessor 112) may utilize a first controller within the transmission interface circuit 118, such as the UFS controller 118U, to send the EOB-related symbols to the host device 50 through the M-PHY circuit 118M, where the memory controller 110 (e.g. the processing circuit such as the microprocessor 112) may utilize the first controller such as the UFS controller 118U to control the M-PHY circuit 118M. For brevity, similar descriptions for this embodiment are not repeated in detail here.

Figure 6:
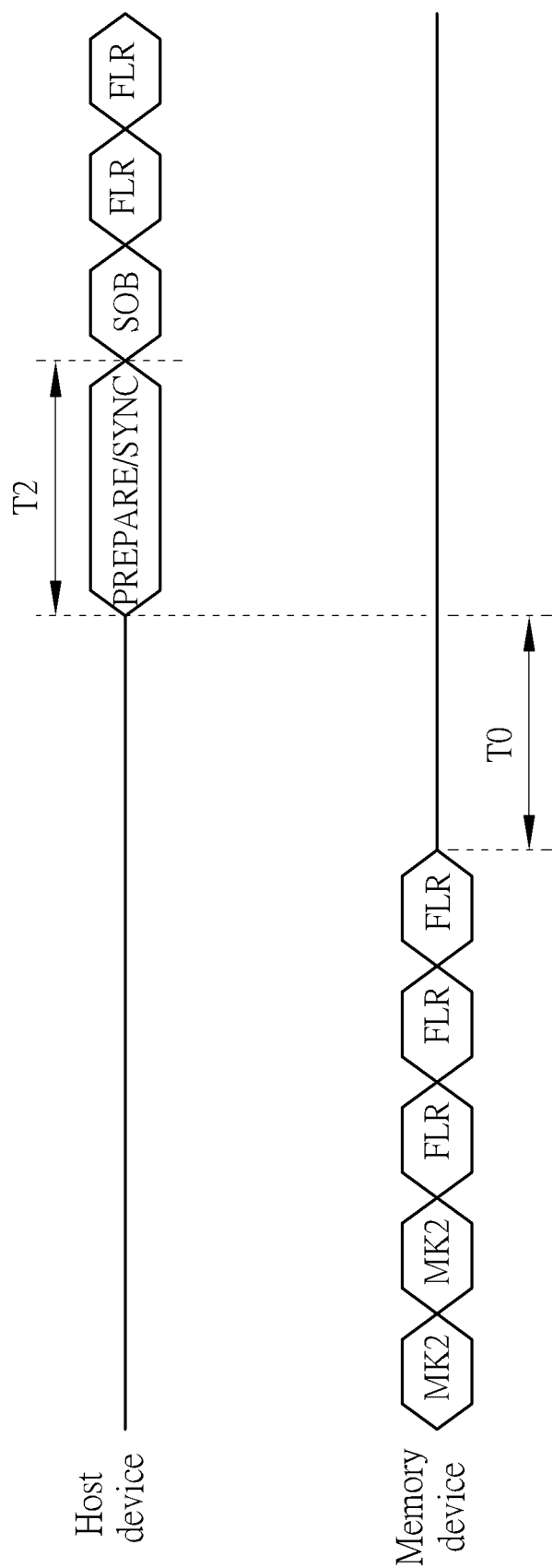
FIG. 6 illustrates a second control scheme of the method according to an embodiment of the present invention.

FIG. 6 illustrates a second control scheme of the method according to an embodiment of the present invention. The memory device 100 (e.g. the memory controller 110) may transmit the pair of MK2 symbols such as {MK2, MK2} and the FLR symbols such as {FLR, FLR, FLR} to the host device 50 through the transmission lane, where the pair of MK2 symbols such as {MK2, MK2} may indicate that entering the advanced power saving mode is required. When controlling the memory device 100 to enter the advanced power saving mode, the memory controller 110 may disable some clocks for performing clock gating on the modules, and may control the M-PHY circuit 118M through the UFS controller 118U to turn off the PLL 214. In addition, the host device 50 may transmit the Prepare signal PREPARE or the Synchronization symbols {SYNC} to trigger the memory device 100 to wake up. During the predetermined time period T2, when controlling the memory device 100 to exit from the advanced power saving mode, the memory controller 110 may enable the clocks that are previously disabled, and may control the M-PHY circuit 118M through the UFS controller 118U to turn on the PLL 214, and the clock generated by the PLL 214 may become available (e.g. ready for use) in time. Afterward, the memory controller 110 (e.g. the transmission interface circuit 118) may receive the start-of-burst (SOB) symbol (which may be referred to as SOB, for brevity) and the subsequent symbols (e.g. the FLR symbols such as {FLR, FLR} and a series of data symbols) from the host device 50 thorough the transmission lane.

Figure 7:
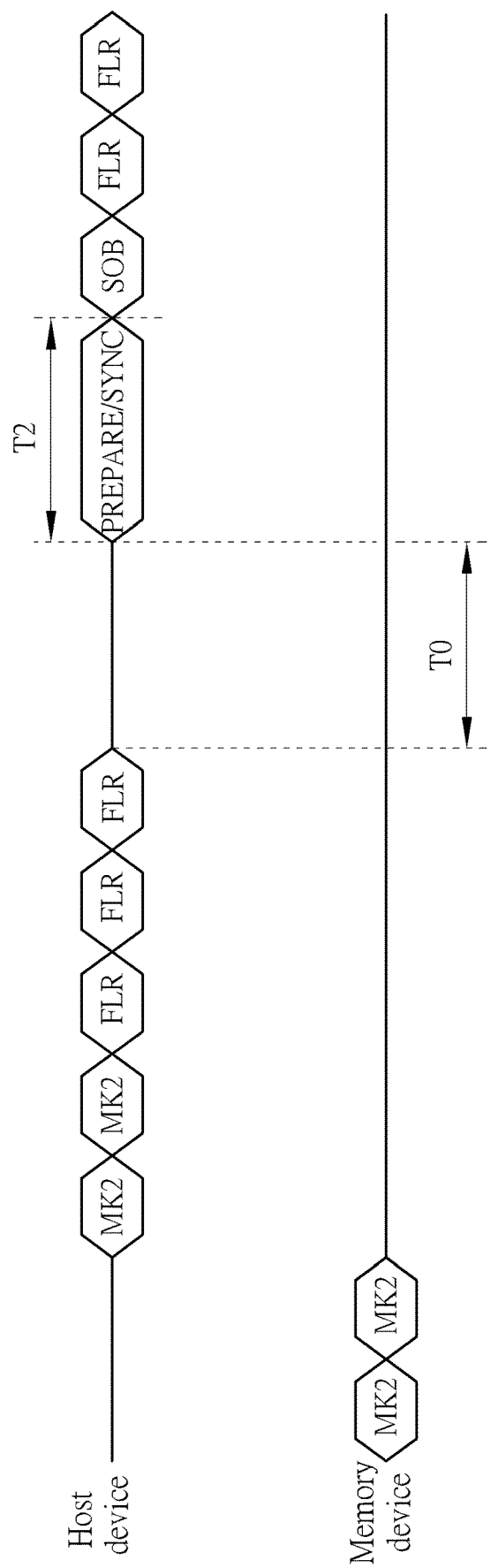
FIG. 7 illustrates a third control scheme of the method according to an embodiment of the present invention.

FIG. 7 illustrates a third control scheme of the method according to an embodiment of the present invention. The memory device 100 (e.g. the memory controller 110) may transmit a first pair of MK2 symbols such as {MK2, MK2} to the host device 50 through the transmission lane, to indicate that entering the advanced power saving mode is required, and the host device 50 may transmit a second pair of MK2 symbols such as {MK2, MK2} and the FLR symbols such as {FLR, FLR, FLR} to the memory device 100 through the transmission lane, where the second pair of MK2 symbols such as {MK2, MK2} may indicate that entering the advanced power saving mode is confirmed. When controlling the memory device 100 to enter the advanced power saving mode, the memory controller 110 may disable some clocks for performing clock gating on the modules, and may control the M-PHY circuit 118M through the UFS controller 118U to turn off the PLL 214. In addition, the host device 50 may transmit the Prepare signal PREPARE or the Synchronization symbols {SYNC} to trigger the memory device 100 to wake up. During the predetermined time period T2, when controlling the memory device 100 to exit from the advanced power saving mode, the memory controller 110 may enable the clocks that are previously disabled, and may control the M-PHY circuit 118M through the UFS controller 118U to turn on the PLL 214, and the clock generated by the PLL 214 may become available (e.g. ready for use) in time. Afterward, the memory controller 110 (e.g. the transmission interface circuit 118) may receive the start-of-burst symbol SOB and the subsequent symbols (e.g. the FLR symbols such as {FLR, FLR} and a series of data symbols) from the host device 50 thorough the transmission lane.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for performing power saving control in a memory device, the method being applicable to a memory controller of the memory device, the memory device comprising the memory controller and a non-volatile (NV) memory, the NV memory comprising at least one NV memory element, the method comprising:
   during transmitting to a host device, sending end of burst (EOB)-related symbols to the host device, in order to notify the host device of EOB;
   controlling a physical layer (PHY) circuit to turn off a clock source within the PHY circuit, in order to save power, wherein the PHY circuit is positioned in a transmission interface circuit within the memory controller, and the transmission interface circuit is arranged to perform communications with the host device for the memory device; and
   when receiving a trigger signal from the host device, utilizing the PHY circuit to turn on the clock source.

2. The method of claim 1, further comprising:
   utilizing a first controller within the transmission interface circuit to send the EOB-related symbols to the host device through the PHY circuit, wherein the memory controller utilizes the first controller to control the PHY circuit.

3. The method of claim 2, further comprising:
   when the first controller is idle and ready for starting an advanced power saving mode, utilizing the first controller to request the PHY circuit to perform power saving.

4. The method of claim 3, further comprising:
   utilizing the first controller to send an advanced power saving mode request to the PHY circuit, in order to request the PHY circuit to perform power saving; and
   after the PHY circuit receives the advanced power saving mode request, utilizing the PHY circuit to turn off the clock source, and send an acknowledge (ACK) to the first controller, for indicating that the PHY circuit is ready for starting the advanced power saving mode.

5. The method of claim 2, further comprising:
   when the first controller and the PHY circuit are ready for starting an advanced power saving mode, controlling the memory controller to perform clock gating.

6. The method of claim 5, wherein the memory controller performs clock gating on multiple modules of the memory controller, to disable clocks originally input into the modules, wherein the modules comprise the first controller.

7. The method of claim 2, wherein the first controller is a Universal Flash Storage (UFS) controller.

8. The method of claim 1, wherein the clock source is a phase-locked loop (PLL).

9. The method of claim 1, wherein the EOB-related symbols comprise a pair of predetermined symbols.

10. The method of claim 1, wherein the EOB-related symbols conform to Unified Protocol (UniPro) specification.

11. A memory device, comprising:
a non-volatile (NV) memory, arranged to store information, wherein the NV memory comprises at least one NV memory element; and
a memory controller, coupled to the NV memory, arranged to control operations of the memory device, wherein the memory controller comprises:
a processing circuit, arranged to control the memory controller according to a plurality of host commands from a host device, to allow the host device to access the NV memory through the memory controller; and
a transmission interface circuit, coupled to the processing circuit, arranged to perform communications with the host device for the memory device, wherein the transmission interface circuit comprises:
a physical layer (PHY) circuit, arranged to perform physical layer operations for the transmission interface circuit;
wherein:
during transmitting to the host device, the memory controller sends end of burst (EOB)-related symbols to the host device, in order to notify the host device of EOB;
the memory controller controls the PHY circuit to turn off a clock source within the PHY circuit, in order to save power; and
when receiving a trigger signal from the host device, the PHY circuit turns on the clock source.

12. The memory device of claim 11, wherein the transmission interface circuit further comprises:
a first controller, coupled to the PHY circuit, arranged to send the EOB-related symbols to the host device through the PHY circuit, wherein the memory controller utilizes the first controller to control the PHY circuit.

13. The memory device of claim 12, wherein when the first controller is idle and ready for starting an advanced power saving mode, the first controller requests the PHY circuit to perform power saving.

14. The memory device of claim 13, wherein the first controller sends an advanced power saving mode request to the PHY circuit, in order to request the PHY circuit to perform power saving; and after receiving the advanced power saving mode request, the PHY circuit turns off the clock source, and sends an acknowledge (ACK) to the first controller, for indicating that the PHY circuit is ready for starting the advanced power saving mode.

15. The memory device of claim 12, wherein when the first controller and the PHY circuit are ready for starting an advanced power saving mode, the memory controller performs clock gating.

16. The memory device of claim 15, wherein the memory controller performs clock gating on multiple modules of the memory controller, to disable clocks originally input into the modules, wherein the modules comprise the first controller.

17. The memory device of claim 12, wherein the first controller is a Universal Flash Storage (UFS) controller.

18. The memory device of claim 11, wherein the clock source is a phase-locked loop (PLL).

19. An electronic device comprising the memory device of claim 11, and further comprising:
the host device, coupled to the memory device, wherein the host device comprises:
at least one processor, arranged for controlling operations of the host device; and
a power supply circuit, coupled to the at least one processor, arranged for providing power to the at least one processor and the memory device;
wherein the memory device provides the host device with storage space.

20. A memory controller of a memory device, the memory device comprising the memory controller and a non-volatile (NV) memory, the NV memory comprising at least one NV memory element, the memory controller comprising:
a processing circuit, arranged to control the memory controller according to a plurality of host commands from a host device, to allow the host device to access the NV memory through the memory controller; and
a transmission interface circuit, coupled to the processing circuit, arranged to perform communications with the host device for the memory device, wherein the transmission interface circuit comprises:
a physical layer (PHY) circuit, arranged to perform physical layer operations for the transmission interface circuit;
wherein:
during transmitting to the host device, the memory controller sends end of burst (EOB)-related symbols to the host device, in order to notify the host device of EOB;
the memory controller controls the PHY circuit to turn off a clock source within the PHY circuit, in order to save power; and
when receiving a trigger signal from the host device, the PHY circuit turns on the clock source.

* * * * *